(12) United States Patent
Wurster et al.

(10) Patent No.: US 8,990,556 B1
(45) Date of Patent: Mar. 24, 2015

(54) SHARING BEACONS

(71) Applicant: Gimbal, Inc., San Diego, CA (US)

(72) Inventors: Charles S. Wurster, San Diego, CA (US); Jose R. Menendez, Encinitas, CA (US)

(73) Assignee: Gimbal, Inc., San Diego, CA (US)

( * ) Notice: Subject to any disclaimer, the term of this patent is extended or adjusted under 35 U.S.C. 154(b) by 0 days.

(21) Appl. No.: 14/459,138

(22) Filed: Aug. 13, 2014

(51) Int. Cl.
*H04L 29/06* (2006.01)
*H04W 12/04* (2009.01)
*H04W 12/08* (2009.01)

(52) U.S. Cl.
CPC .............. *H04W 12/04* (2013.01); *H04W 12/08* (2013.01)
USPC ........................................................ 713/158

(58) Field of Classification Search
None
See application file for complete search history.

(56) References Cited

U.S. PATENT DOCUMENTS

| | | | |
|---|---|---|---|
| 5,784,028 A | 7/1998 | Corman et al. |
| 5,812,086 A | 9/1998 | Bertiger et al. |
| 6,052,786 A | 4/2000 | Tsuchida |
| 6,513,015 B2 | 1/2003 | Ogasawara |
| 6,536,658 B1 | 3/2003 | Rantze |
| 6,970,092 B2 | 11/2005 | Hum et al. |
| 7,260,835 B2 | 8/2007 | Bajikar |
| 7,376,583 B1 | 5/2008 | Rolf |
| 7,413,121 B2 | 8/2008 | Goel et al. |
| 7,658,327 B2 | 2/2010 | Tuchman et al. |
| 7,737,861 B2 | 6/2010 | Lea et al. |
| 7,752,329 B1 | 7/2010 | Meenan et al. |
| 7,791,455 B1 | 9/2010 | MacLean, III et al. |
| 7,849,318 B2 | 12/2010 | Zhang et al. |
| 7,880,616 B2 | 2/2011 | Kanagala et al. |
| RE42,435 E | 6/2011 | Katz |
| 7,962,361 B2 | 6/2011 | Ramchandani et al. |
| 8,023,895 B2 | 9/2011 | Smith |
| 8,050,984 B2 | 11/2011 | Bonner et al. |

(Continued)

FOREIGN PATENT DOCUMENTS

| | | |
|---|---|---|
| EP | 1626363 A1 | 2/2006 |
| EP | 2200218 A1 | 6/2010 |

(Continued)

OTHER PUBLICATIONS

Anonymous. "Stream cipher." *Wikipedia: The Free Encyclopedia.* Wikimedia Foundation, Inc. Last modified Jan. 20, 2012. Web. Feb. 6, 2012. [Retrieved on Sep. 18, 2014 Internet Archive WayBackMachine].

(Continued)

*Primary Examiner* — Brandon Hoffman
(74) *Attorney, Agent, or Firm* — Mintz Levin Cohn Ferris Glovsky and Popeo, P.C.

(57) ABSTRACT

Data is received that specifies at least one beacon associated with a first account and a first validity window specifying a time period during which the at least one beacon is to be associated with an additional account. Thereafter, a first key is generated which, when registered by a second account, causes the at least one beacon to be associated with the second account until expiration of the first validity window. Prior to registration of the first key and additionally outside the first validity window the at least one beacon is associated solely with the first account. After the registration of the first key, the at least one beacon is caused to be associated with the second account during the first validity window. Related apparatus, systems, techniques and articles are also described.

22 Claims, 6 Drawing Sheets

(56) References Cited

U.S. PATENT DOCUMENTS

| | | |
|---|---|---|
| 8,090,399 B2 | 1/2012 | Howarter et al. |
| 8,145,125 B2 | 3/2012 | Masoian et al. |
| 8,160,577 B2 | 4/2012 | Bailin et al. |
| 2002/0062251 A1 | 5/2002 | Anandan et al. |
| 2004/0002897 A1 | 1/2004 | Vishik |
| 2004/0082343 A1 | 4/2004 | Kim et al. |
| 2004/0198221 A1 | 10/2004 | Bin et al. |
| 2006/0036485 A1 | 2/2006 | Duri et al. |
| 2006/0178986 A1 | 8/2006 | Giordano et al. |
| 2008/0107274 A1 | 5/2008 | Worthy |
| 2008/0123683 A1 | 5/2008 | Cheng et al. |
| 2008/0187137 A1 | 8/2008 | Nikander et al. |
| 2009/0103722 A1 | 4/2009 | Anderson et al. |
| 2009/0185677 A1 | 7/2009 | Bugbee |
| 2009/0210932 A1 | 8/2009 | Balakrishnan et al. |
| 2009/0254416 A1 | 10/2009 | Nomula |
| 2009/0315704 A1 | 12/2009 | Rosing et al. |
| 2010/0027783 A1 | 2/2010 | Yup |
| 2010/0070369 A1 | 3/2010 | Fenton et al. |
| 2010/0203833 A1 | 8/2010 | Dorsey |
| 2010/0267375 A1 | 10/2010 | Lemmon et al. |
| 2010/0287250 A1 | 11/2010 | Carlson et al. |
| 2011/0032916 A1 | 2/2011 | Lee |
| 2011/0138192 A1 | 6/2011 | Kocher et al. |
| 2011/0176465 A1 | 7/2011 | Panta et al. |
| 2011/0179064 A1 | 7/2011 | Russo |
| 2012/0029691 A1 | 2/2012 | Mockus et al. |
| 2012/0047011 A1 | 2/2012 | Rippetoe et al. |
| 2012/0201383 A1 | 8/2012 | Matsuo |
| 2012/0207302 A1 | 8/2012 | Alexander et al. |
| 2012/0209744 A1 | 8/2012 | Mullen et al. |
| 2012/0226537 A1 | 9/2012 | Subbarao et al. |
| 2012/0239504 A1 | 9/2012 | Curlander et al. |
| 2012/0278172 A1 | 11/2012 | Mercuri et al. |
| 2013/0006726 A1* | 1/2013 | Tijink et al. ............ 705/13 |
| 2013/0214909 A1 | 8/2013 | Meijers et al. |
| 2013/0217332 A1 | 8/2013 | Altman et al. |
| 2013/0282438 A1 | 10/2013 | Hunter et al. |
| 2013/0297422 A1 | 11/2013 | Hunter et al. |
| 2014/0133656 A1 | 5/2014 | Wurster et al. |

FOREIGN PATENT DOCUMENTS

| | | |
|---|---|---|
| KR | 20090095869 A | 9/2009 |
| WO | WO-02073864 A2 | 9/2002 |
| WO | WO-2005025127 A1 | 3/2005 |
| WO | WO-2007059558 A1 | 5/2007 |
| WO | WO-2009130796 A1 | 10/2009 |
| WO | WO-2010117364 A1 | 10/2010 |
| WO | WO-2012035149 A1 | 3/2012 |
| WO | WO-2013034924 A1 | 3/2013 |

OTHER PUBLICATIONS

Barahim, M.Z. et al. "Low-Cost Bluetooth Mobile Positioning for Location-based Application," *IEEE* (2007):1-4. ISBN: 14244-1007-X. [Retrieved on Sep. 17, 2014].

Chaudhry M A, R., and Sheikh, Dr. Muhammad Imran. "Protocols Stack & Connection Establishment in Bluetooth Radio." *IEEE.* (2002):48-55. ISBN: 0-7803-7505-X. [Retrieved on Sep. 17, 2014].

Kim, H.W., et al. "Symmetric Encryption in RFID Authentication Protocol for Strong Location Privacy and Forward-Security." *IEEE.* Hybrid Information Technology (ICHIT '06). (2006):718-723. ISBN: 0-7695-2674-8/06. [Retrieved on Sep. 17, 2014].

Schneider M A., and Felten, Edward W. "Efficient Commerce Protocols based on One-time Pads." *IEEE* (2000):317-326. ISBN:1063-9527/00. [Retrieved on Sep. 17, 2014].

Tsudik, Gene. "A Family of Dunces: Trivial RFID Identification and Authentication Protocols". Borisov, N. and Golle, P. (Eds.): PET 2007. LNCS 4776.(2007):45-61. [Retrieved on Sep. 17, 2014].

Zuo, Yanjun. "Secure and private search protocols for RFID systems. ", *INF SYS FRONT.* (2010). 12:507-519. Published online: Aug. 28, 2009. DOI: 10.1007/s10796-009-9208-6. [Retrieved on Sep. 17, 2014].

* cited by examiner

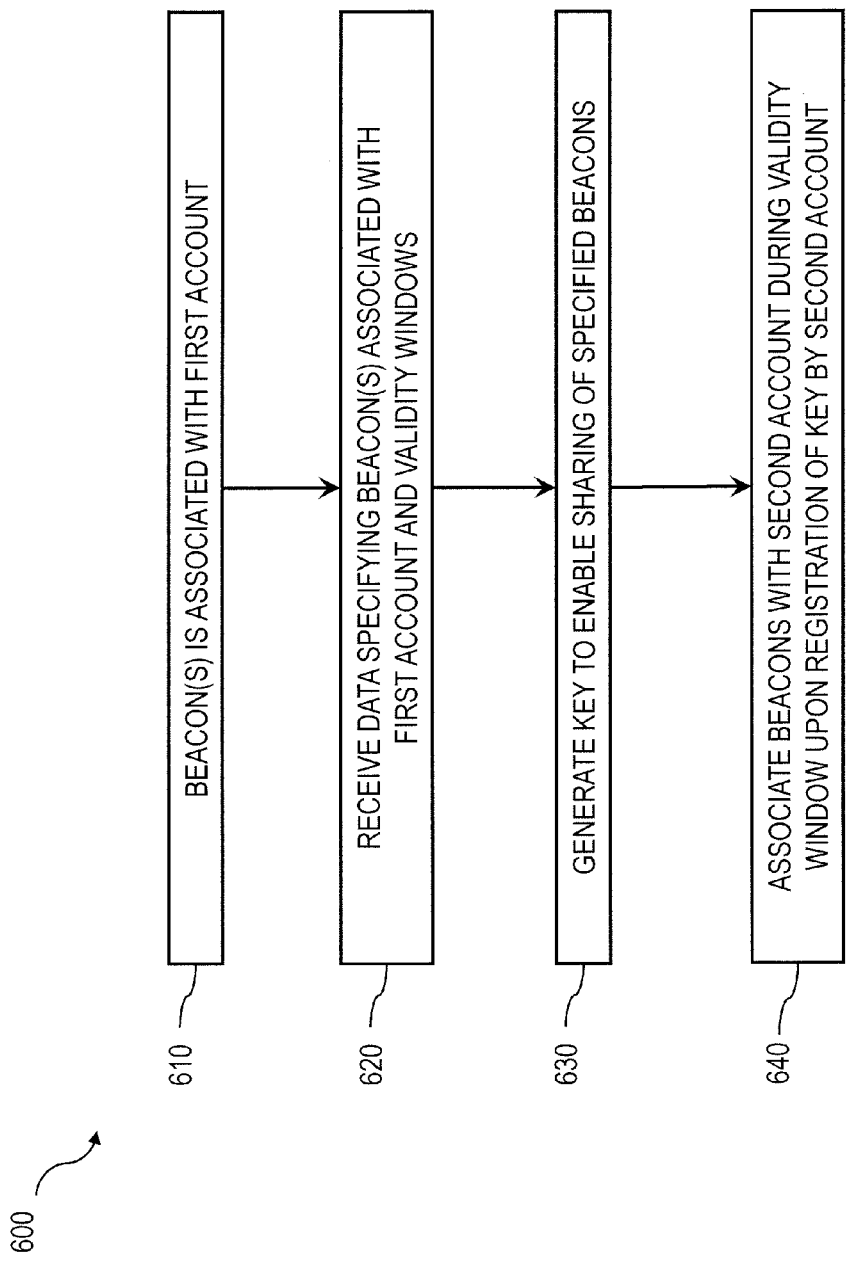

SHARING BEACONS

TECHNICAL FIELD

The subject matter described herein relates to the selective sharing of beacons across different accounts.

BACKGROUND

Beacons are increasingly being used for a variety of applications because of their low power requirements and low costs. Beacons transmit identifiers (typically a universally unique identifier) that are detected by applications or operating systems on client devices (e.g., mobile phones, etc.). Such detection can be used, in some scenarios, to initiate an action on the client device which may be based on the specific location of the client device as indicated by detecting the nearby beacon. For example, companies use beacons to extend the effectiveness of their mobile applications by adding real-time context to their offers and services which then can engage customers in the right way, at the right place and the right time. In addition, brands are empowered to increase sales and drive loyalty by delivering highly relevant content and services to consumers who are physically present in their stores & venues or stores and venues where their products and services can be found.

Beacons are typically owned and managed by a single entity. Switching the owner may require a burdensome configuration process and/or changes to client software. One alternative is to set up separate co-extensive beacon arrays at a given location which in turn can be costly, space consuming and time consuming.

SUMMARY

In one aspect, data is received that specifies at least one beacon associated with a first account and a first validity window specifying a time period during which the at least one beacon is to be associated with an additional account. Thereafter, a first key is generated which, when registered by a second account, causes the at least one beacon to be associated with the second account until expiration of the first validity window. Outside the first validity window the at least one beacon remain associated solely with the first account.

In some variations, the at least one beacon can be associated with the second account in addition to the first account during the first validity window (as opposed to such beacons being exclusively associated with the second account).

Data can later be received that revokes the first key. In such cases, the at least one beacon can be caused to no longer be associated with the second account during the first validity window after the first key revocation.

Each key can be a unique alphanumeric string that can only be registered once.

Data can be received that specifies restrictions on use of the at least one beacon. In such cases, the association of the at least one beacon with the second account prevents the one or more of the beacons to be used in contravention with the specified restrictions on use of the at least one beacon. The specified restrictions on use of the at least one beacon can include, for example, prevention of at least one of: editing at least one beacon or deleting at least one beacon.

Data can be received that specifies permissible uses of the at least one beacon. In such cases, the association of the at least one beacon with the second account prevents one or more of the beacons to be used for other than the specified permissible uses. The specified permissible uses of the at least one beacon can include, for example, at least one of: detection of each of a plurality of beacons, presenting a notification to an end-user on a client device, launching or changing a user interface on a client device, logging that the end-user was near a beacon at a certain time and dwelled nearby it for an amount of time.

Data can be received that specifies at least one beacon (which may or may not be fully coextensive with the previous beacon array) associated with the first account and a second validity window specifying a time period during which one or more beacons are to be associated with an additional account. Thereafter, a second key can be generated which, when registered by a third account, causes at least one beacon to be associated with the third account until expiration of the second validity window. In some cases, the first validity window can at least partially overlap with the second validity window. Registration of the second key can cause the first key to be revoked such that the at least one beacon is no longer associated with the second account during the first validity window and/or the overlap of the first validity window and the second validity window. Alternatively, the at least one beacon can be associated with both the second account and the third account during the overlap of the first validity window and the second validity window. The at least one beacon can in some cases also remain associated with the first account during the first validity window and the second validity window.

Data can be received that specifies exclusivity terms for the first key such that, after the registration of the first key, the at least one beacon is exclusively associated with the second account during the first validity window according to the exclusivity terms. The exclusivity terms can specify complete exclusivity for the second account with the exception of the first account. The exclusivity terms can specify exclusivity for the second account with the exception of the first account. Data can be received that specifies exclusivity terms for a second key such that, after the registration of the second key, the first key is revoked such that the at least one beacon is no longer associated with the second account during the first validity window.

Non-transitory computer program products (i.e., physically embodied computer program products) are also described that store instructions, which when executed by one or more data processors of one or more computing systems, causes at least one data processor to perform operations herein. Similarly, computer systems (which can additionally include one or more beacons) are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides a user-friendly platform that enables beacons and beacon arrays to be rapidly shared amongst multiple entities.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 6 is a diagram illustrating a process for selectively sharing beacons between different accounts.

Like reference symbols in the various drawings indicate like elements.

DETAILED DESCRIPTION

The current subject matter is directed to the sharing of beacons amongst various accounts to selectively allow different account holders to take and selectively use a set of beacons. For example, an account holder having an array of beacons may be willing to share them with business partners selectively during particular times.

The current subject matter can be used in connection with a beacon platform such as that described in U.S. patent application Ser. No. 13/773,379 entitled: "Platform for Wireless Identity Transmitter and System Using Short Range Wireless Broadcast" and published as U.S. Pat. App. Pub. No. 2013/0217332, and U.S. patent application Ser. No. 13/833,110 entitled: "Retail Proximity Marketing" and published as U.S. Pat. App. Pub. No. 2013/0297422, the contents of both of which are hereby fully incorporated by reference.

Figure 1:
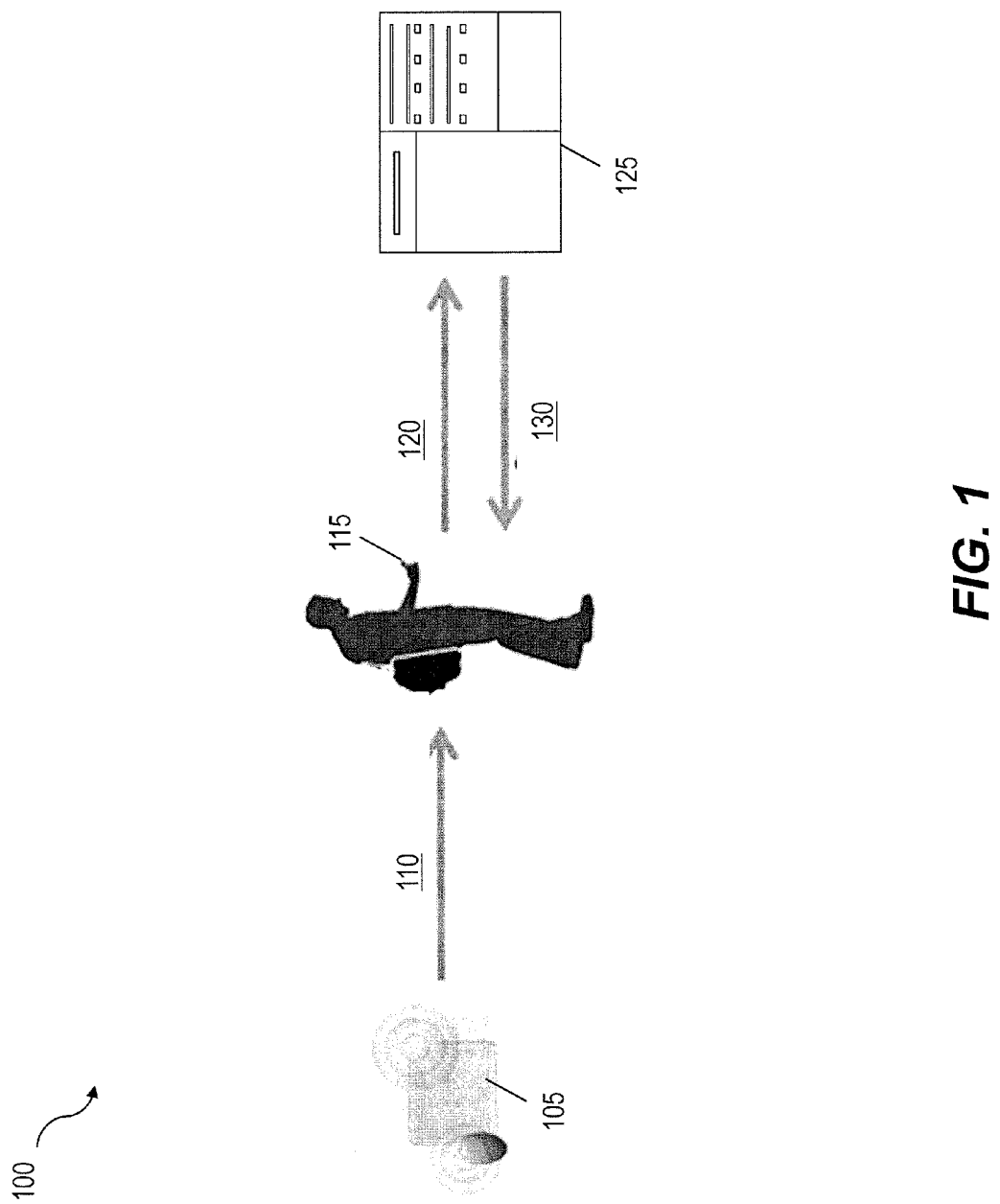
FIG. 1 is a diagram illustrating signaling among a beacon, a client device, and a beacon server.

FIG. 1 is a first diagram 100 illustrating interaction among a beacon 105, a client device 115, and a beacon server 125. The beacon 105 periodically emits a transmission that identifies, at a minimum, an identification of the beacon (e.g., unique name, etc.) The identification may be directly or may change periodically resulting in the need for the identification of the beacon to require assistance from a beacon server. In some cases, the transmission may include additional data such as metadata characterizing beacon can also form part of the transmission. Thereafter, at 110, software resident on a client device 115 (e.g., a mobile phone, etc.) detects the transmission. The client device 115 (via the software) next, at 120, relays data characterizing the detected transmission to a beacon server 125. The beacon server 125 then determines whether the software on the client device 115 is authorized to receive the beacon information. After such determination is made, the beacon server 125, at 130, sends the beacon information in addition to any metadata the server has about the beacon to the software on the client device and what actions the software on the client device is permitted to take 115. If the software is not authorized, the beacon server 125, at 130, sends an indication that the software not ask about the beacon transmission for some period of time. In some cases, the transmissions by the beacon 105 are secure (e.g. encrypted, uses rotating identifiers, etc) such that the beacon can only be correctly identified via an interaction with the beacon server 125. In other cases, the transmissions by the beacon 105 are not secure such that the client device 115 can correctly identify the beacon without an interaction with the beacon server 125 (however in some cases the client device 115 can still interact with the beacon server 125 to obtain any metadata and/or data specifying permitted actions).

Various types of actions can be initiated based on the software identifying the beacon. Sample actions include, for example, presenting a notification to the end-user, launching or changing a user interface, logging that the end-user was near a beacon at a certain time and dwelled nearby it for an amount of time, etc.

Figure 2:
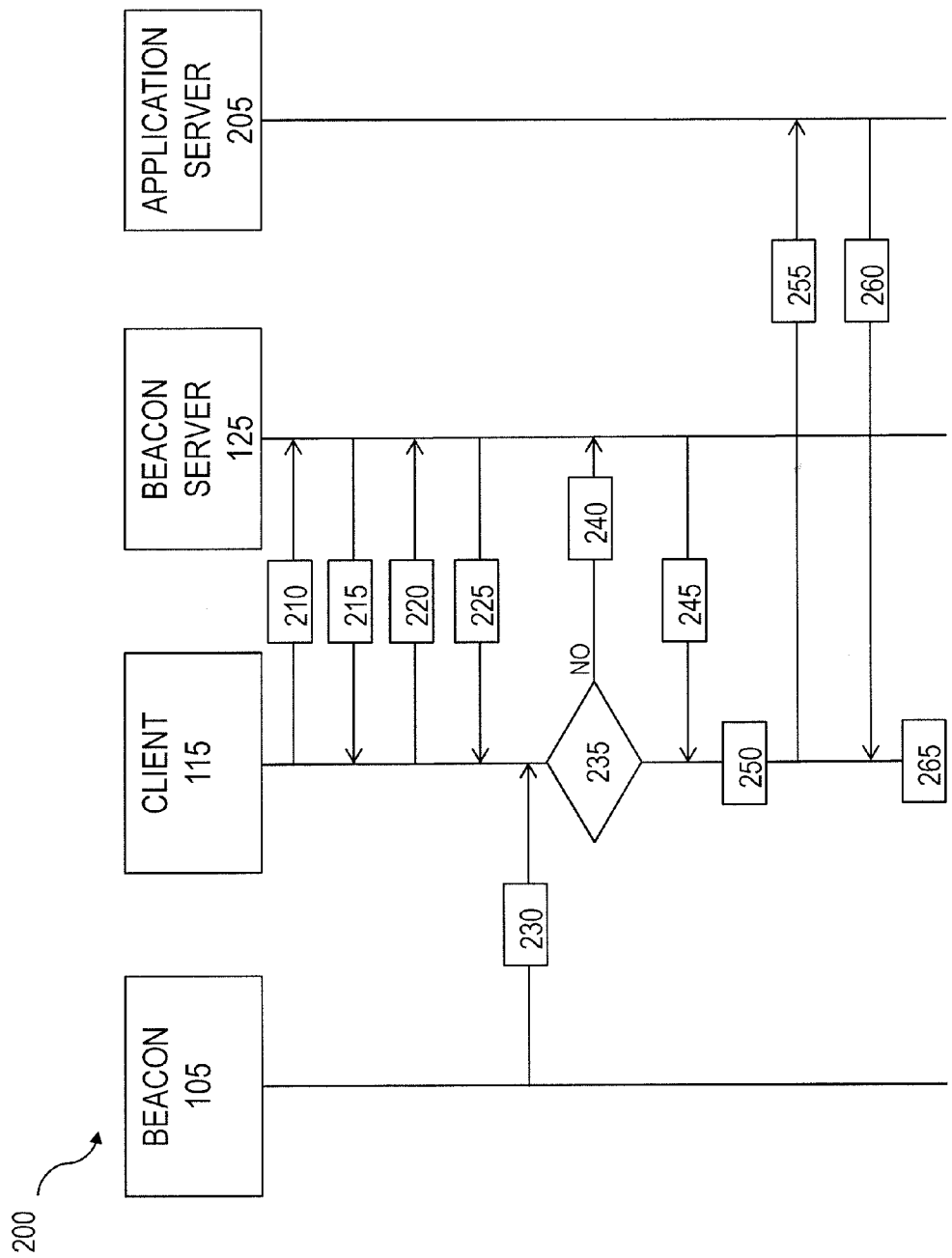
FIG. 2 is a diagram illustrating signaling among a beacon, a client device, a beacon server, and an application server.

FIG. 2 is a second diagram 200 illustrating interaction among a beacon 105, a client device 115, and a beacon server 125, and additionally among an application server 205 (which pertains to applications that can be executed on the client device 115). After software is installed on the client device 115, and as part of a registration process, the client device 115, at 210, can transmit a getID request to the beacon server 125. The beacon server 125 can reply, at 215, with an identification for the software. Such identification can be a unique alphanumeric string. The client device 115 can subsequently transmit, at 220, contextual data. Such contextual data can include information about a end-user of the client device 115, previous beacon detections by the software, location history of the end-user (e.g. a list of latitude and longitude points the end-user has dwelled at), and the like. Thereafter, the beacon server 125 can transmit, at 225, data to the software on the client device 115 that includes information about nearby beacons and what actions, if any, should be triggered in response to their detection. The client device 115 can store such application triggering data locally (i.e., such data can be cached) on the client device 115 so that actions may be triggered automatically without the need for subsequent interaction with the beacon server 115 or the application server 205.

At some later point, the client device 115 can, at 230, be within a range of the beacon 105 such that the software can detect a transmission from the beacon 105 that identifies such beacon. It is then determined, at 235, whether there the client device 115 includes cached authorization for identifying the beacon as well as application triggering data that is associated with the identity of such beacon. If it is determined that there is cached authorization and application triggering data, the software notifies the application it is associated with or operating system on the client device 115 which, in turn, can trigger one or more actions. In addition, the detection of the beacon 105 and the triggering of actions can be stored in a log that can, at some later point, be transmitted to the beacon server 125. If it is determined that there is no cached authorization, then, at 240, the software can relay the secure beacon transmission to beacon server 125 and request authorization as well as any application trigger data.

The beacon server 125 can then determine whether the software is authorized to be informed of the beacon identity and which actions, if any, to take in connection with the detected beacon 105 and, at 245, transmit the beacon identity, metadata and application triggering data back to the client device 115 for local storage (i.e., caching, etc.). If the server response 245 is that the beacon 105 is to be ignored for period of time, then no further events occur. Otherwise, at 250, the application triggering data causes the software to notify the application it is associated with about the beacon 105 so that an action may be initiated. In either event, the action/ignore events can be stored in the software's log for later transmission to the beacon server 125. With the former arrangement, in some cases, the call into the corresponding application can cause the client device, at 255, to transmit data to an application server 205 (i.e., a server associated with the application that was notified about the beacon 105, etc.) characterizing the call. The application server 205 can make a determination of which action should be initiated by the application (associated with the software) on the client device 115 and transmit further application triggering data, at 260, specifying such action or actions, if any. If the application server response 260 is that the beacon 105 is to be ignored for period of time, then no further events occur. Otherwise, at 265, the application triggering data from the application server causes the software to notify the application it is associated with about the beacon 105 so that the corresponding action or actions may be initiated.

Figure 3:
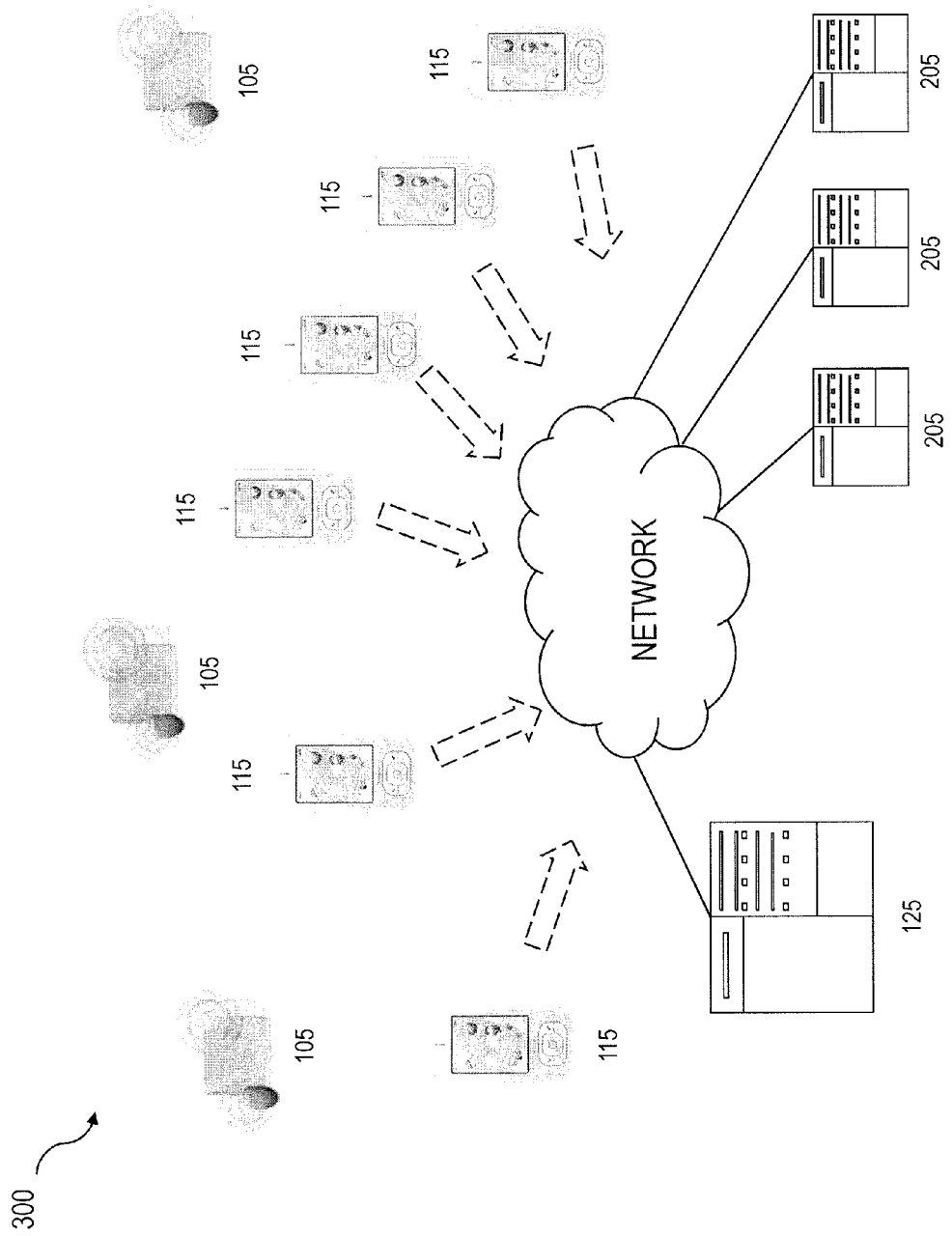
FIG. 3 is a diagram illustrating a system including a plurality of beacons, client devices, application servers and a beacon server.

With reference to diagram 300 of FIG. 3, it will be appreciated that signaling illustrated in FIGS. 1 and 2 can be among a plurality of beacons 105 distributed at different locations, client devices 115 used by different end-users, and application servers 205 associated with different applications (e.g., retail store application, coffee shop application, etc.). It will also be appreciated that there can, in some variations, be multiple beacon servers 125 (either redundant or particular to pre-determined beacons and/or software instances). Further, each client device 115 can have multiple instances of the software which in turn can interact individually based on the beacons 105 and any cached/received authorization and application triggering data.

The beacon server 125 can manage and/or interface with a platform that enables different account holders to detect the beacons 105. For example, the platform can associate a particular beacon with a particular account. The account holder for such account can then define what actions are triggered by a corresponding application when a particular associated beacon is detected. Stated differently, the account holder can define what actions will be triggered (and thus form part of the application triggering data sent by the beacon server 125 to the client device 115).

The platform can include a web portal that allows an account holder (sometimes referred to as the owner) to select beacons to be shared with another account holder (sometimes referred to as the second account). In addition, the owner can specify a validity window during which the second account can detect the selected beacons. In other cases, the validity window (e.g., expiration date, etc.) can be pre-defined or at a default value (e.g., 30 minutes, etc.) but modifiable by the owner. Furthermore, the owner can add metadata related to the beacons such as names (e.g., zone 3 beacon, etc.), tags (e.g., entrance, exit, etc.) and the like.

In some cases, the account holder can specify, on a beacon-by-beacon basis or on a group, permissible interactions. Such actions can include presenting a notification to the end-user, launching or changing a user interface, logging that the end-user was near a beacon at a certain time and dwelled nearby it for an amount of time, performing actions only when the application is in the foreground, performing actions only when the application is in the background, etc.

The account holder can then request that the platform generate a sharing key that encapsulates the beacons and metadata to be shared and present it to the second account holder. Such key can in some cases be unique and/or a one-time use key. The owner can give the key to any other entity having an account on the platform (e.g., the second account holder, etc.). The platform can cause the key to be transferred directly from the owner to another account holder or such transfer can be performed external to the platform. With the latter arrangement, a user associated with the second account can receive the key from the owner, log onto the portal of the platform, and enter the key.

Thereafter, when accessing the portal, the user of the second account can be presented with information pertinent to the account. For example, a table of keys that have been entered, the name of the corresponding account holder, when the keys were entered, when the keys were revoked and/or when the validity windows for the keys expired can be presented. Similarly, a table of shared beacons, (e.g. beacons made temporarily available by account holders via sharing keys given), the name of the corresponding owner, when the beacons became available, when the ability to detect the beacons will expire, and the like can be presented.

As can be appreciated, the second account can lose all access to shared beacons when the corresponding validity window or windows expire. In addition, in some cases, the second account can lose access to the shared beacons upon revocation of the key by the owner (which can be performed via the portal). Further, the developer can lose access to a subset of the shared beacons if the owner deactivates (e.g. deletes) the beacons from their account.

Various mechanisms can be provided by the platform to allow account holders to identify beacons associated with one account to be permanently transferred to another account (i.e., sold, etc.) or for which temporary access can be granted (i.e. rented). For example, an exchange can be accessible via a web portal that either lists or otherwise provides a graphical representation of beacons available for transfer/temporary use.

As noted above, the portal can provide an exchange (i.e., an online marketplace facilitating transactions amongst a plurality of account holders). An exchange can facilitate transactions amongst beacon owners and other account holders that do not have a pre-existing relationship. With the exchange, an owner can log onto the portal, select a subset of beacons, set the validity window (e.g., start date, expiration date, valid times etc.), add metadata (name, tags, pricing, etc.), and request to be listed as a beacon network in the exchange table. The owner can also specify permissible interactions using the beacons. Further, the owner can specify certain parameters on the sharing of the beacon such as whether the sharing is exclusive (e.g. only one account holder can detect the beacons at a time), exclusive for a particular field of market (e.g. only one account holder in the fast food restaurant market can detect the beacons at a time), non-exclusive, and the like.

In some implementations, the identity of the beacon owners remains anonymous. The owner can in some variations not specify a price for sharing the beacons and actively solicit bids from other account holders (in some cases with minimum bid levels, etc.). In other variations, the owner can specify a price for sharing the beacons (e.g., $1000/day for an array of beacons, etc.). The owner can also specify time limitations during which bids would be accepted and the like.

Users can log onto the portal, browse the exchange tables/views (e.g., beacon locations overlaid on a map, etc.) to find a beacon network that meets their requirements (e.g. location, metadata description, pricing, etc.). The user can then select such beacon network and then place a bid on it, or in the case of a fixed price listing, accept the listing price. If the beacon sharing is marked as exclusive, the selection of a beacon can invalidate other listings that offer the same beacon for sharing with an overlapping validity window. If the bid is accepted or the fixed price is accepted, the platform can then automatically populate the beacon network into the shared beacon table of the buyer's account or otherwise facilitate the sharing of beacons.

Figure 4:
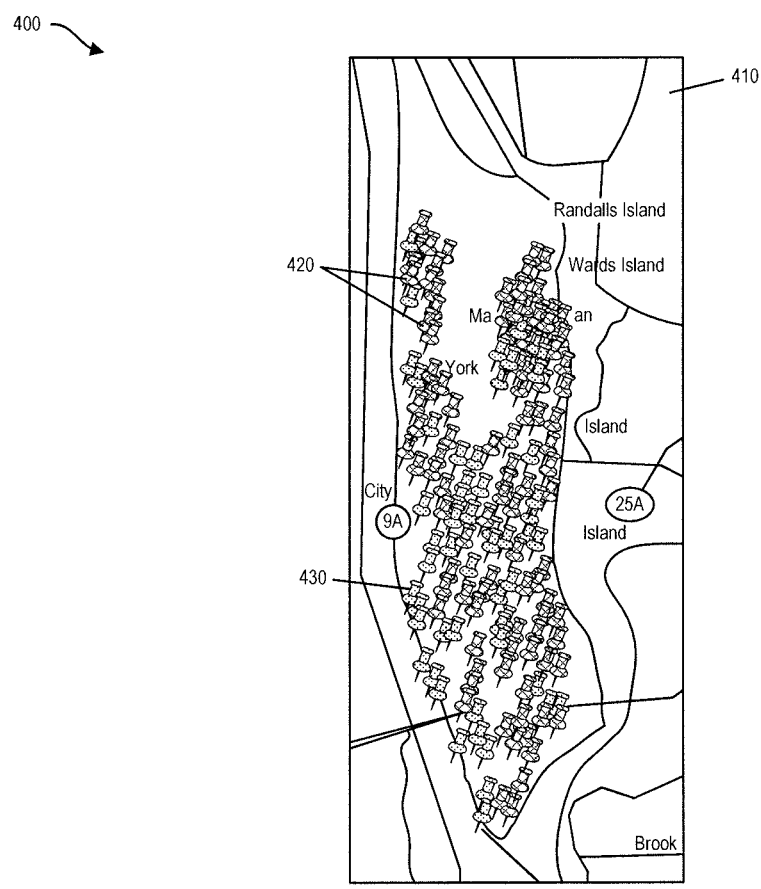
FIG. 4 is a diagram illustrating a graphical user interface for selecting beacons available for temporary sharing.

FIG. 4 is an example diagram 400 illustrating a graphical user interface 410 in which beacons are overlaid on a map to show their positions. A first set of graphical user interface elements 420 that correspond to beacons that are not available can be represented in a first color and a second set of graphical user interface elements 430 can correspond to beacons that are available for temporary use can be represented in a second color. Other graphical indications can be provided to distinguish available/non-available beacons or available beacons by allowed interaction type (e.g. logging, triggering notifications, etc.). Furthermore, in other variations, only available beacons can be illustrated/listed.

Figure 5:
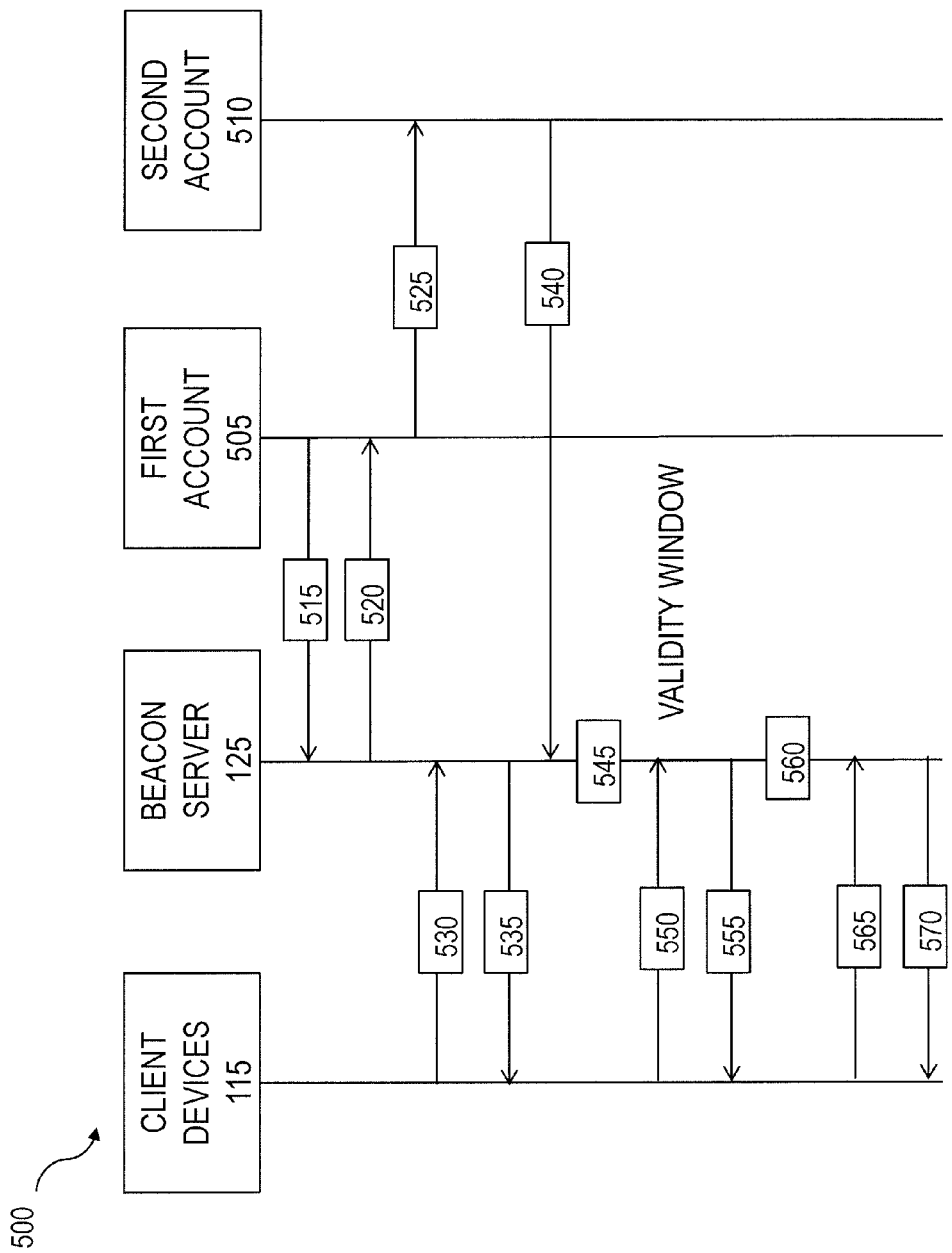
FIG. 5 is a diagram illustrating signaling in connection with the generation of keys for sharing of beacons.

FIG. 5 is a diagram 500 illustrating interaction among client devices 115, the beacon server 125, a node associated with a first account 505, and a node associated with a second account 510. Initially, an array of beacons are solely associated with the first account 505. Thereafter, at 515, a request is made by the first account 505 to the beacon server 125 to generate a sharing key for the array of beacons. Such request also specifies a validity window in which the array of beacons can be shared. The beacon server 125 then generates a key encapsulating the array of beacons and the validity window and, at 520, transmits the key to the first account 505. The first account 505 subsequently, at 525, transmits the key to the second account 510. In the meantime, a client device 115, at 530, transmits data to the beacon server 125 that includes data identifying a detected beacon (which forms part of the array of beacons). The beacon server 125 then associates the detected beacon with the first account 505 and, at 535, transmits corresponding data (metadata, actions, etc.) back to the client device 115. Later, at 540, the second account 510 sends data to the beacon server 125 to register the key. The beacon server 125 then causes the array of beacons to be associated with the second account 510. Next, a client device 115, at 550, transmits data to the beacon server 125 that includes data identifying a detected beacon (which forms part of the array of beacons). The beacon server 125 then associates the detected beacon with the second account 510 and, at 555, transmits corresponding data (metadata, actions, etc.) back to the client device 115. Upon expiration of the validity window, at 560, the beacon server 125 causes the array of beacons to no longer be associated with the second account 510 such that later received transmissions (565) from client devices 115 indicating detection of beacons in the array of beacons are associated with the first account 505 and return transmissions (570) indicate same. It will be appreciated that the example of FIG. 5 is only one possible arrangement, and there can be other examples in which the software associated with the first account and the second account run on separate client devices (as opposed to a single client device as illustrated).

FIG. 6 is a diagram 600 in which, initially, at 610, one or more beacons are associated with a first account. Thereafter, at 620, data is received that specifies at least one beacon (of the one or more beacons) associated with the first account and a first validity window that in turn specifies a time period during which the at least one beacon is to be associated with an additional account. Subsequently, at 630, a first key is generated, which when registered by a second account, causes the at least one beacon to be additionally associated with the second account until expiration of the first validity window. Thereafter, at 640, after both the registration of the first key and commencement of the first validity window, the at least one beacon is associated with the second account during the first validity window.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. As an example, while the above passages relate to a plurality of beacons, sharing can be conducted on a beacon by beacon basis and the subject matter described herein can be tailored accordingly. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, with reference to FIG. 6, the beacons can be solely associated with the first account prior to the receipt of the data specify the beacons to be shared (which in turn results in the generation of a key). Other implementations may be within the scope of the following claims.

What is claimed is:

1. A method comprising:
   receiving data specifying at least one beacon associated with a first account and a first validity window specifying a time period during which the at least one beacon is to be associated with an additional account;
   generating a first key which, when registered by a second account, causes the at least one beacon to be associated with the second account during the first validity window;
   causing the at least one beacon to be associated solely with the first account outside the first validity window; and
   causing, after the registration of the first key, the at least one beacon to be associated with the second account during the first validity window.

2. The method of claim 1, wherein the at least one beacon is associated with the second account in addition to the first account during the first validity window.

3. The method of claim 1 further comprising:
   receiving data revoking the first key; and
   causing the at least one beacon to no longer be associated with the second account during the first validity window after the first key revocation.

4. The method of claim 1, wherein each key is a unique alphanumeric string that can only be registered once.

5. The method of claim 1 further comprising:
   receiving data specifying restrictions on use of the at least one beacon, wherein the association of the at least one beacon with the second account prevents the at least one beacon to be used in contravention with the specified restrictions.

6. The method of claim 5, wherein the specified restrictions on use of the at least one beacon includes prevention of at least one of: editing at least one beacon or deleting at least one beacon.

7. The method of claim 1 further comprising:
   receiving data specifying permissible uses of the at least one beacon, wherein the association of the at least one beacon with the second account prevents the at least one beacon to be used for other than the specified permissible uses.

8. The method of claim 7, wherein the specified permissible uses of the at least one beacon comprise at least one of: detection of each of a plurality of beacons, presenting a notification to an end-user on a client device, launching or changing a user interface on a client device, logging that the end-user was near a beacon at a certain time and dwelled nearby it for an amount of time.

9. The method of claim 1 further comprising:
   receiving data specifying the at least one beacon associated with the first account and a second validity window specifying a time period during which the at least one beacon is to be associated with an additional account; and
   generating a second key which, when registered by a third account, causes the at least one beacon to be associated with the third account until expiration of the second validity window.

10. The method of claim 9 further comprising:
    causing, after the registration of the second key, the at least one beacon to be associated with the third account during the second validity window.

11. The method of claim 9, wherein the first validity window overlaps, at least in part, with the second validity window.

12. The method of claim 11, wherein the registration of the second key causes the first key to be revoked such that the at least one beacon is no longer associated with the second account during the first validity window and/or the overlap of the first validity window and the second validity window.

13. The method of claim 11, wherein the at least one beacon is associated with both the second account and the third account during the overlap of the first validity window and the second validity window.

14. The method of claim 13, wherein the at least one beacon is further associated with the first account during the overlap of the first validity window and the second validity window.

15. The method of claim 1 further comprising:
    receiving data specifying exclusivity terms for the first key; and
    wherein, after the registration of the first key, the at least one beacon is associated with the second account during the first validity window according to the exclusivity terms.

16. The method of claim 15, wherein the exclusivity terms specify complete exclusivity for the second account with the exception of the first account.

17. The method of claim 15, wherein the exclusivity terms specify partial exclusivity for the second account with the exception of the first account.

18. The method of claim 15 further comprising:
    receiving data specifying exclusivity terms for a second key; and
    wherein, after the registration of the second key, the first key is revoked such that the at least one beacon is no longer associated with the second account during the first validity window.

19. The method of claim 1, wherein the at least one beacon is solely associated with the first account during the first validity window until such time as the first key is registered by the second account.

20. A non-transitory computer program product storing instructions which, when executed by at least one data processor forming part of at least one computing system, result in operations comprising:
  receiving data specifying at least one beacon associated with a first account and a first validity window specifying a time period during which the at least one beacon is to be associated with an additional account;
  generating a first key which, when registered by a second account, causes the at least one beacon to be associated with the second account until expiration of the first validity window;
  causing the at least one beacon to be associated solely with the first account outside the first validity window; and
  causing, after the registration of the first key, the at least one beacon to be associated with the second account during the first validity window.

21. A system comprising:
  at least one beacon;
  at least one data processor; and
  memory storing instructions which, when executed by the at least one data processor, result in operations comprising:
    receiving data specifying at least one beacon associated with a first account and a first validity window specifying a time period during which the at least one beacon is to be associated with an additional account;
    generating a first key which, when registered by a second account, causes the at least one beacon to be associated with the second account until expiration of the first validity window;
    causing the at least one beacon to be associated solely with the first account prior to registration of the key and additionally outside the first validity window; and
    causing, after the registration of the first key, the at least one beacon to be associated with the second account during the first validity window.

22. A method comprising:
  receiving, by a beacon server, data specifying at least one beacon associated with a first account and a first validity window specifying a time period during which the at least one beacon is to be associated with an additional account;
  generating, by a beacon server, a first key which, when registered by a second account via the beacon server, causes the at least one beacon to be associated with the second account during the first validity window;
  causing, by the beacon server, the at least one beacon to be associated solely with the first account outside the first validity window; and
  causing, by the beacon server after the registration of the first key, the at least one beacon to be associated with the second account during the first validity window;
  wherein:
    software on a client device detects transmissions from one beacon of the at least one beacon;
    the software on the client device relays data characterizing the detected transmission to the beacon server;
    the beacon server sends beacon information associated with the first account to the software on the client device if the software on the client device is associated with the first account and it is outside the first validity window;
    the beacon server sends beacon information associated with the second account to the software on the client device if the software on the client device is associated with the second account and it is within the first validity window.

\* \* \* \* \*